(12) United States Patent
Li et al.

(10) Patent No.: US 11,690,475 B2
(45) Date of Patent: Jul. 4, 2023

(54) COOKING APPLIANCE

(71) Applicant: ZHEJIANG SHAOXING SUPOR DOMESTIC ELECTRICAL APPLIANCE CO., LTD, Zhejiang (CN)

(72) Inventors: Jinzhou Li, Zhejiang (CN); Jian Li, Zhejiang (CN); Guoying He, Zhejiang (CN)

(73) Assignee: ZHEJIANG SHAOXING SUPOR DOMESTIC ELECTRICAL APPLIANCE CO., LTD

( * ) Notice: Subject to any disclaimer, the term of this patent is extended or adjusted under 35 U.S.C. 154(b) by 0 days.

(21) Appl. No.: 17/789,916

(22) PCT Filed: Apr. 20, 2020

(86) PCT No.: PCT/CN2020/085589
§ 371 (c)(1),
(2) Date: Jun. 29, 2022

(87) PCT Pub. No.: WO2021/134981
PCT Pub. Date: Jul. 8, 2021

(65) Prior Publication Data
US 2023/0031394 A1    Feb. 2, 2023

(30) Foreign Application Priority Data

Dec. 31, 2019  (CN) .......................... 201911419988.4
Dec. 31, 2019  (CN) .......................... 201922502034.1

(51) Int. Cl.
*A47J 37/06*    (2006.01)
*A47J 27/00*    (2006.01)
*A47J 36/06*    (2006.01)

(52) U.S. Cl.
CPC ......... *A47J 37/0641* (2013.01); *A47J 27/004* (2013.01); *A47J 36/06* (2013.01)

(58) Field of Classification Search
CPC .... A47J 27/004; A47J 43/046; A47J 37/0641; A47J 37/0629; A47J 37/0623;
(Continued)

(56) References Cited

U.S. PATENT DOCUMENTS

| 5,873,298 A | 2/1999 | Chang |
| 2005/0223906 A1* | 10/2005 | Xu ......................... A47J 27/004 |
| | | 99/348 |
| 2019/0045973 A1* | 2/2019 | Gill ..................... A47J 27/0804 |

FOREIGN PATENT DOCUMENTS

| CN | 102499572 A | 6/2012 |
| CN | 104586233 A | 5/2015 |

(Continued)

OTHER PUBLICATIONS

International Search Report for Application No. PCT/CN2020/085589 dated Oct. 10, 2020, 4 pages.
(Continued)

*Primary Examiner* — Phuong T Nguyen
(74) *Attorney, Agent, or Firm* — Lerner David LLP

(57) ABSTRACT

A cooking appliance includes an appliance cover, appliance body and inner lid, the appliance cover arranged above the appliance body in a closable and openable manner, the appliance body having a heating structure. The appliance cover includes a cover body that includes a venting passage providing communication between the cooking appliance and the outside, the inner lid detachably mounted to the cover body; a baking assembly arranged below the cover body, the inner lid located below the baking assembly when mounted to the cover body; a venting cap detachably mounted at any one end of the two ends of the venting passage, wherein the venting cap is assembled at a bottom
(Continued)

end of the venting passage when the inner lid is dismounted, and the venting cap is assembled at a top end of the venting passage after the inner lid is mounted.

12 Claims, 12 Drawing Sheets

(58) Field of Classification Search
CPC ...... A47J 36/165; A47J 27/0804; A47J 27/08; A47J 27/0802; A47J 27/04; A47J 43/0772; A47J 27/086; A47J 39/003; A47J 36/12; A47J 37/1266; A47J 36/06
USPC .......... 219/385, 400, 413, 520; 99/348, 410, 99/416, 417, 418, 476; 426/243, 440, 426/511
See application file for complete search history.

(56) References Cited

FOREIGN PATENT DOCUMENTS

| | | |
|---|---|---|
| CN | 105231802 A | 1/2016 |
| CN | 205018872 U | 2/2016 |
| CN | 110250927 A | 9/2019 |
| CN | 209644658 U | 11/2019 |
| JP | 2002219049 A | 8/2002 |

OTHER PUBLICATIONS

Written Opinion for Application No. PCT/CN2020/085589 dated Sep. 27, 2020, 4 pages.

* cited by examiner

COOKING APPLIANCE

CROSS-REFERENCE TO RELATED APPLICATIONS

The present application is a national phase entry under 35 U.S.C § 371 of International Application No. PCT/CN2020/085589 filed Apr. 20, 2020, which claims priority from Chinese Patent Application Nos. 201922502034.1 and 201911419988.4, both filed on Dec. 31, 2019, all of which are hereby incorporated herein by reference.

FIELD OF THE INVENTION

The invention relates to the technical field of domestic electrical appliances, and in particular to a cooking appliance.

BACKGROUND OF THE INVENTION

Currently, every pressure and baking 2-in-1 cooker has one common venting passage. However, cooking by baking and conventional cooking have different venting needs. During cooking by baking, air needs to be admitted and vented at the same time inside the cooking appliance, so as to ensure circulation of the air inside the cooking appliance. During conventional cooking, hot air needs to be vented out directly, and there is no need to admit air. However, with one venting passage, it is very difficult to achieve the two venting modes.

In other words, in such a cooking appliance of the prior art, there exists the problem that the two venting modes are incompatible.

SUMMARY OF THE INVENTION

A main objective of the invention is to provide a cooking appliance, so as to solve the problem present in a cooking appliance of the prior art that the two venting modes are incompatible.

To achieve the above-described objective, the invention provides a cooking appliance comprising an appliance cover, an appliance body and an inner lid, the appliance cover being coveringly arranged above the appliance body in a closable and openable manner, the appliance body being provided with a heating structure, the appliance cover comprising: a cover body, the cover body being provided with a venting passage through which the inside of the cooking appliance communicates with the outside, the inner lid being detachably mounted to the cover body; a baking assembly, the baking assembly being arranged below the cover body, the inner lid being located below the baking assembly when mounted to the cover body; a venting cap, the venting cap being detachably mounted at any one end of the two ends of the venting passage, wherein the venting cap is assembled at a bottom end of the venting passage when the inner lid is dismounted, and the venting cap is assembled at a top end of the venting passage after the inner lid is mounted.

By providing the venting passage on the appliance cover, hot air inside the cooking appliance can be vented to the outside of the cooking appliance. By providing the baking assembly, the cooking appliance can operate to cook by baking. By providing the inner lid, the cooking appliance can operate to conventionally cook, increasing the versatility of the cooking appliance. Under a mode of cooking by baking, air needs to be admitted and vented at the same time. During cooking by baking, the venting cap is mounted below the venting passage, which can reduce the speed of air flowing out of the cooking appliance, so that the circulation time of high temperature air circulating inside the cooking appliance is increased and thus baking efficiency can be improved. Moreover, the venting cap will not cover the top of the venting passage, and will not affect air admission of the venting passage, so as to ensure air circulation during baking by the cooking appliance. Under a conventional cooking mode, air inside the cooking appliance needs to be continuously vented out. With the venting cap mounted at the top of the venting passage, space can be spared for the inner lid to facilitate the mounting of the inner lid, and in the meanwhile air flowing from the top of the venting passage into the inside of the cooking appliance can be reduced, so as to ensure that air inside the cooking appliance is rapidly vented out, ensuring the stability of the functioning of conventional cooking.

Optionally, the venting cap is provided with venting holes, and is connected with the venting passage in a sealing manner. With the venting cap being connected with the venting passage in a sealing manner, air entering into the zone between the venting cap and the venting passage can be reduced.

Optionally, a side wall of the venting passage is provided with a first through hole which is in communication with a space inside the baking assembly. When the venting cap is assembled at the bottom end of the venting passage, the first through hole is in communication with the venting passage. When the venting cap is assembled at the top end of the venting passage, the venting cap blocks air inside the appliance body from entering into the first through hole. With this configuration, when the cooking appliance operates to conventionally cook, humid air inside the appliance body will not enter into the first through hole, ensuring that the structure in the first through hole will not be subject to humidity and can steadily function.

Optionally, the cooking appliance also comprises an air admission leading structure having an air admission passage. Through the air admission leading structure, the first through hole communicates with the space inside the baking assembly. The air admission leading structure can plan the air flowing direction, so as to ensure that air enters only into the space inside the baking assembly, reducing air accumulation in the cover body, preventing the water content in the air from affecting electrical parts inside the cover body, improving the stability and safety of the functioning of the cover body, and reducing hidden safety hazards.

Optionally, a side wall of the venting passage is provided with a second through hole which is in communication with a pressure limiting valve assembly. When the venting cap is assembled at the bottom end of the venting passage, the venting cap blocks air inside the appliance body from entering into the second through hole. When the venting cap is assembled at the top end of the venting passage, the second through hole is in communication with the venting passage. The switching of position of the venting cap can cause the second through hole to be opened and closed, so that the second through hole functions or does not function.

Optionally, the inner lid is provided with the pressure limiting valve assembly extending into the venting passage and located at the second through hole. The cover body comprises a push bar extending out of the second through hole, so that the push bar can operate the pressure limiting valve assembly. When the venting cap is mounted at the top end of the venting passage, the second through hole is in communication with the venting passage, so that the push bar can extend out of the second through hole to push the pressure limiting valve assembly, causing air inside the cooking appliance to be vented through the pressure limiting valve assembly.

Optionally, an outer wall of the venting cap is provided with a first position limiting structure, and a side wall of the venting passage is provided with a second position limiting structure that cooperates with the first position limiting structure. When the venting cap is mounted to the venting passage, the first position limiting structure is connected in a snap-fit manner with the second position limiting structure. With the cooperation between the first position limiting structure and the second position limiting structure, the venting cap can be steadily mounted inside the venting passage, reducing the likelihood of the venting cap being detached from the venting passage, and improving the stability of the functioning of the venting cap.

Optionally, the first position limiting structure is a position limiting protrusion, and the second position limiting structure is a position limiting slot; alternatively, the first position limiting structure is a position limiting slot, and the second position limiting structure is a position limiting protrusion. This configuration facilitates the assembly between the first position limiting structure and the second position limiting structure, and the first position limiting structure and the second position limiting structure are not easily detached from each other, so as to ensure the stability of the functioning of the venting cap.

Optionally, the appliance cover also comprises a sealing structure sleeved on an outer wall of the venting cap. The venting cap blocks the first through hole by using the sealing structure when the venting cap is assembled at the top end of the venting passage. The venting cap blocks the second through hole by using the sealing structure when the venting cap is assembled at the bottom end of the venting passage.

Optionally, the outer wall of the venting cap is provided with a first snap-fit connecting flange, and an inner wall of the venting passage is provided with a second snap-fit connecting flange that cooperates with the sealing structure. The sealing structure is connected in a snap-fit manner between the first snap-fit connecting flange and the second snap-fit connecting flange, so as to prevent the sealing structure from dropping out, ensuring that the sealing structure can steadily seal the gap between the venting cap and the venting passage.

Optionally, the venting cap is provided with an abutting flange located at one end of the venting cap. When the venting cap is assembled at the top end of the venting passage, the abutting flange overlaps with a face cover of the cover body and achieves sealing with the face cover. When the venting cap is assembled at the bottom end of the venting passage, the abutting flange abuts against a reflective cover of the cover body and achieves sealing with the reflective cover. By providing the abutting flange, sealing of a part of the structure of the venting passage can be achieved, so as to reduce the effect of air on the venting passage.

DESCRIPTION OF THE DRAWINGS

The accompanying drawings of the specification, which constitute a part of the application, are used to provide further understanding of the invention. The illustrative embodiments of the invention and their description help to explain the invention, and do not constitute an undue limitation of the invention. In the accompanying drawings.

Figure 1:
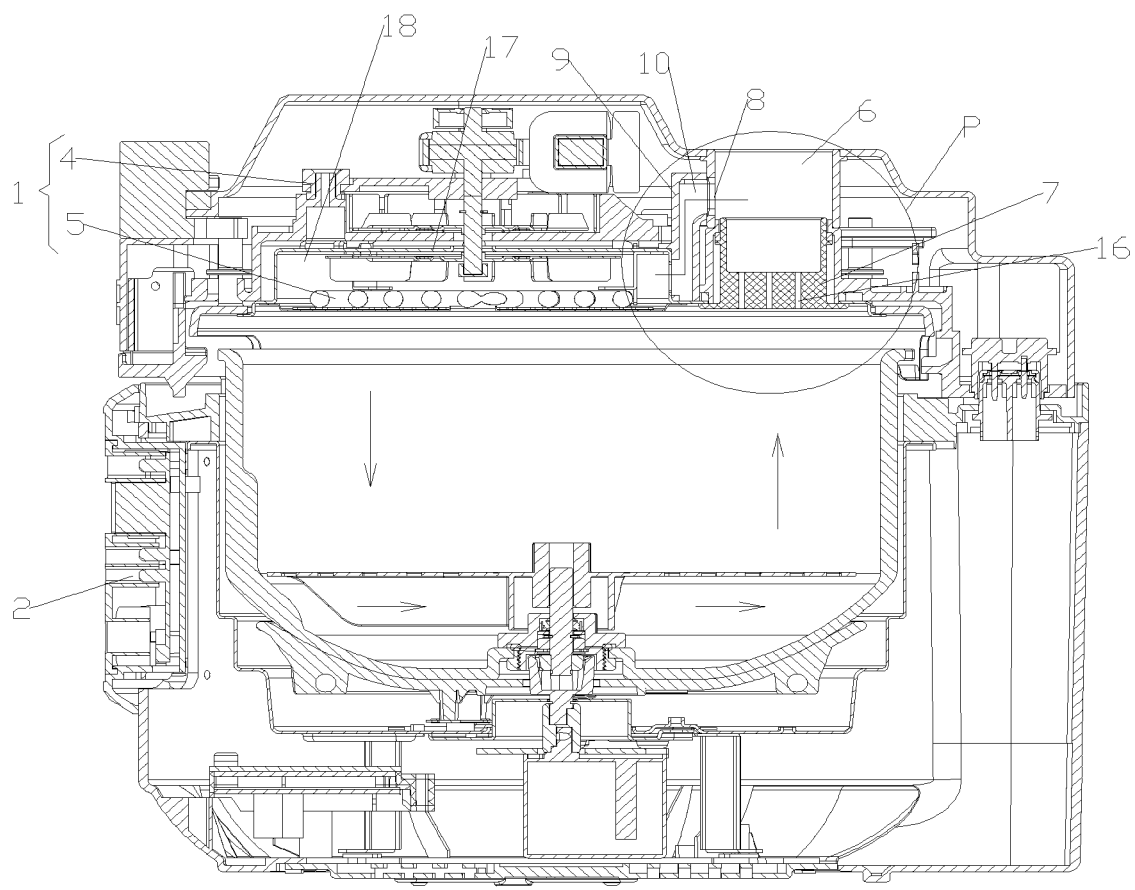
FIG. 1 shows an overall structural schematic view of a cooking appliance of an alternative embodiment of the invention.

In those figures, the above-described figures contain the following reference signs:

1. appliance cover; 2. appliance body; 3. inner lid; 4. cover body; 5. baking assembly; 6. venting passage; 7. venting cap; 8. first through hole; 9. air admission leading structure; 10. air admission passage; 11. push bar; 12. second through hole; 13. pressure limiting valve assembly; 14. first position limiting structure; 15. second position limiting structure; 16. venting holes; 17. reflective cover; 18. accommodating groove; 19. fan; 20. heating element; 21. covering plate; 22. mesh holes; 23. first snap-fit connecting flange; 24. sealing structure; 25. second snap-fit connecting flange; 26. abutting flange; 39. connecting cylinder; 40. stopper cylinder; 41. face cover; 43. lining; 120. abutting segment.

DETAILED DESCRIPTION OF THE INVENTION

It should be noted that, when there is no conflict, the embodiments in the application and their features can be combined with each other. The invention will be described below in reference to the accompanying drawings and in connection with embodiments.

It should be noted that, unless otherwise specifically indicated, all technical and scientific terms used in the application have the same meaning as commonly understood by an ordinary person skilled in the art in the technical field to which the application belongs.

In the invention, unless otherwise indicated, directional terms used such as "upper", "lower", "top" and "bottom" generally refer to the directions shown in the accompanying drawings, or refer to the vertical, perpendicular or gravity direction of a component itself. Similarly, to facilitate understanding and description, "inner" and "outer" refer to the inside and outside relative to the contour of the respective component itself. However, those directional terms are not used to limit the invention.

In order to solve the problem present in a cooking appliance of the prior art that two venting modes are incompatible, the invention provides a cooking appliance.

As shown in FIG. 1 to FIG. 15, the cooking appliance comprises an appliance cover 1, an appliance body 2 and an inner lid 3. The appliance cover 1 is coveringly arranged above the appliance body 2 in a closable and openable manner. The appliance body 2 is provided with a heating structure. The appliance cover 1 comprises a cover body 4, a baking assembly 5 and a venting cap 7, the baking assembly 5 being arranged below the cover body 4, the cover body 4 being provided with a venting passage 6 through which the inside of the cooking appliance communicates with the outside, the inner lid 3 being detachably mounted to the cover body 4 and located below the baking assembly 5, the venting cap 7 being detachably mounted at any one end of the two ends of the venting passage 6, wherein the venting cap 7 is assembled at a bottom end of the venting passage 6 when the inner lid 3 is dismounted, and the venting cap 7 is assembled at a top end of the venting passage 6 after the inner lid 3 is mounted.

By providing the venting passage 6 on the appliance cover 1, hot air inside the cooking appliance can be vented to the outside of the cooking appliance. By providing the baking assembly 5, the cooking appliance can operate to cook by baking. By providing the inner lid 3, the cooking appliance can operate to conventionally cook, increasing the versatility of the cooking appliance. Under a mode of cooking by baking, air needs to be admitted and vented at the same time. During cooking by baking, the venting cap 7 is mounted below the venting passage 6, which can reduce the speed of air flowing out of the cooking appliance, so that the circulation time of high temperature air circulating inside the cooking appliance is increased and thus baking efficiency can be improved. Moreover, the venting cap 7 will not cover the top of the venting passage 6, and will not affect air admission of the venting passage 6, so as to ensure air circulation during baking by the cooking appliance. Under a conventional cooking mode, air inside the cooking appliance needs to be continuously vented out. With the venting cap 7 mounted at the top of the venting passage 6, space can be spared for the inner lid 3 to facilitate the mounting of the inner lid 3, and in the meanwhile air flowing from the top of the venting passage 6 into the inside of the cooking appliance can be reduced, so as to ensure that air inside the cooking appliance is rapidly vented out, ensuring the stability of the functioning of conventional cooking.

As shown in FIG. 1 to FIG. 4, the venting cap 7 is provided with venting holes 16, and is connected with the venting passage 6 in a sealing manner. With the venting cap 7 being connected with the venting passage 6 in a sealing manner, air entering into the zone between the venting cap 7 and the venting passage 6 can be reduced. As the cooking appliance will produce a large amount of oily waste during cooking by baking, by providing the venting cap 7, accumulation of oily waste inside the venting passage 6, which is difficult to clean and susceptible of creating unpleasant odors, can be reduced. With the venting cap 7 being connected with the venting passage 6 in a sealing manner, the oily waste vapor entering into the venting passage 6 can be reduced, so that oily waste vapor is discharged via the venting holes 16 on the venting cap 7, enhancing user experience. As the venting cap 7 is detachable, oily waste accumulating on the venting cap 7 can be cleaned, and during the cleaning, water will not end up flowing into the inside of the appliance cover 1, preventing the inside the appliance cover 1 from being humid and greatly improving the stability and safety of the utilization of the cooking appliance.

It should be noted that preferably there are a plurality of venting holes 16 arranged in a spaced-apart manner, so as to ensure the venting efficiency of the venting cap 7.

As shown in FIG. 1 to FIG. 4, a side wall of the venting passage 6 is provided with a first through hole 8. When the venting cap 7 is assembled at the bottom end of the venting passage 6, the first through hole 8 is in communication with the venting passage 6. When the venting cap 7 is assembled at the top end of the venting passage 6, the venting cap 7 blocks the first through hole 8. The first through hole 8 in the venting passage 6 is in communication with the inside of the baking assembly 5, used to maintain the balance of air pressure inside the baking assembly 5. After the inner lid 3 is mounted to the appliance cover 1, the venting cap 7 is assembled at the top end of the venting passage 6 and blocks the first through hole 8, so as to prevent the humid air inside the appliance body 2 from entering into the inside of the baking assembly 5 via the first through hole 8 when the cooking appliance operates to conventionally cook, reducing the effect of the humid air on electrical parts inside the baking assembly 5 and improving the stability and safety of the utilization of the appliance cover 1. When the inner lid 3 is not mounted to the appliance cover 1, the venting cap 7 is assembled at the bottom end of the venting passage 6. At this time, the cooking appliance can only operates to cook by baking. At this time, the venting passage 6 is in communication with the first through hole 8, so that air can flow into the inside of the baking assembly 5 via the venting passage 6 and the first through hole 8, ensuring the balance of air pressure the baking assembly 5.

It should be noted that "block" means that the first through hole 8 is isolated so that air inside the appliance body 2 does not flow into the first through hole 8, rather than mean that the venting cap 7 must be necessarily pressed against the first through hole 8. The venting cap 7 can be arranged to be spaced apart from the first through hole 8, so long as the first through hole 8 is isolated from the air flowing path.

As shown in FIG. 1 to FIG. 4, the cooking appliance further comprises an air admission leading structure 9 having an air admission passage 10. Through the air admission leading structure 9, the first through hole 8 communicates with the space inside the baking assembly 5. The air admission leading structure 9 can plan the air flowing direction, so as to ensure that air enters only into the space inside the baking assembly 5, reducing air accumulation in the cover body 4, preventing the water content in the air from affecting electrical parts inside the cover body 4, improving the stability and safety of the functioning of the cover body 4 and reducing hidden safety hazards.

As shown in FIG. 1, the cover body 4 comprises a reflective cover 17 having an accommodating groove 18 with an opening orienting downwards. The baking assembly 5 comprises a fan 19, a heating element 20 and a covering plate 21. The fan 19 is fixed to the reflective cover 17, and a fan blade of the fan 19 is located inside the accommodating groove 18. The heating element 20 is mounted inside the accommodating groove 18 and located below the fan 19. The covering plate 21 is arranged at the opening of the accommodating groove 18, and is provided with a plurality of mesh holes 22. After the heating element 20 works, it will cause the temperature of air around the heating element 20 to rise. The fan 19 operates to blow high temperature air towards the appliance body 2, so that the high temperature air is blown by the fan through the mesh holes 22 into the appliance body 2 to bake food inside the appliance body 2.

It should be noted that, during cooking by baking, air enters into the space inside the baking assembly 5 via the venting passage 6, the first through hole 8 and the air admission leading structure 9. Under the hot baking of the heating element 20, air becomes hot. The fan 19 blows the hot air inside the baking assembly 5 towards the covering plate 21, and the hot air enters into the appliance body 2 through the mesh holes 22. After the hot air circulates in the appliance body 2, the hot air will be vented to the outside of the cooking appliance via the venting passage 6 or enter again into the inside of the baking assembly 5 via the first through hole 8. With this configuration, the hot air inside the appliance body 2 enters into the inside of the baking assembly 5, reducing the time used for heating air by the baking assembly 5, and improving baking efficiency of the cooking appliance.

Figure 6:
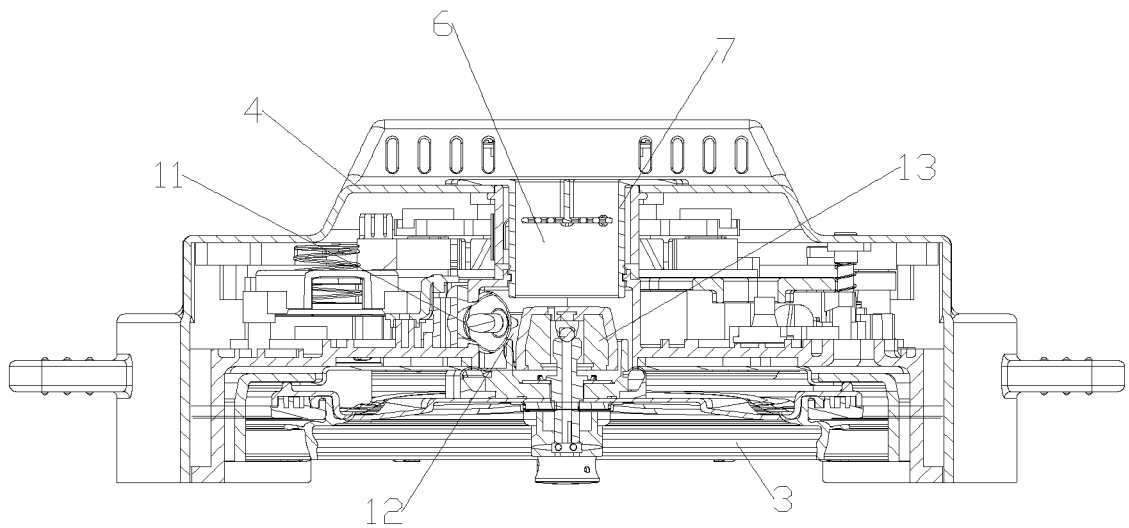
FIG. 6 shows a sectional view from an angle of the appliance cover in FIG. 1 with an inner lid mounted below it.
Figure 7:
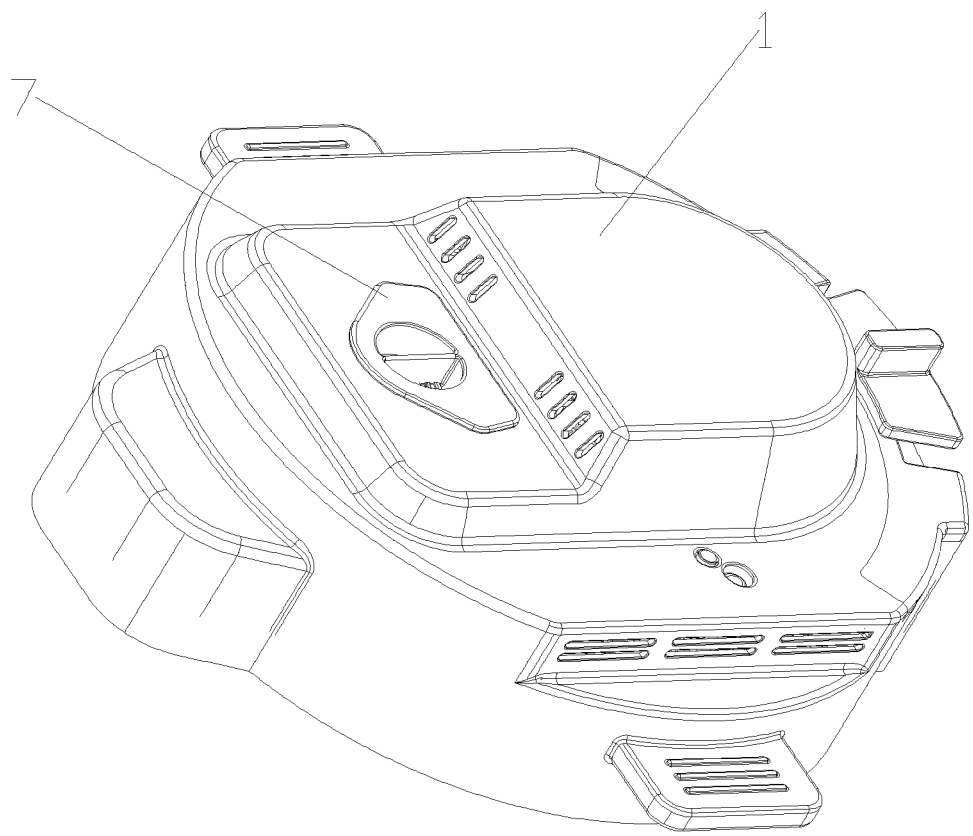
FIG. 7 shows a schematic view of the positional relationship between the appliance cover in FIG. 1 and the venting cap.
Figure 8:
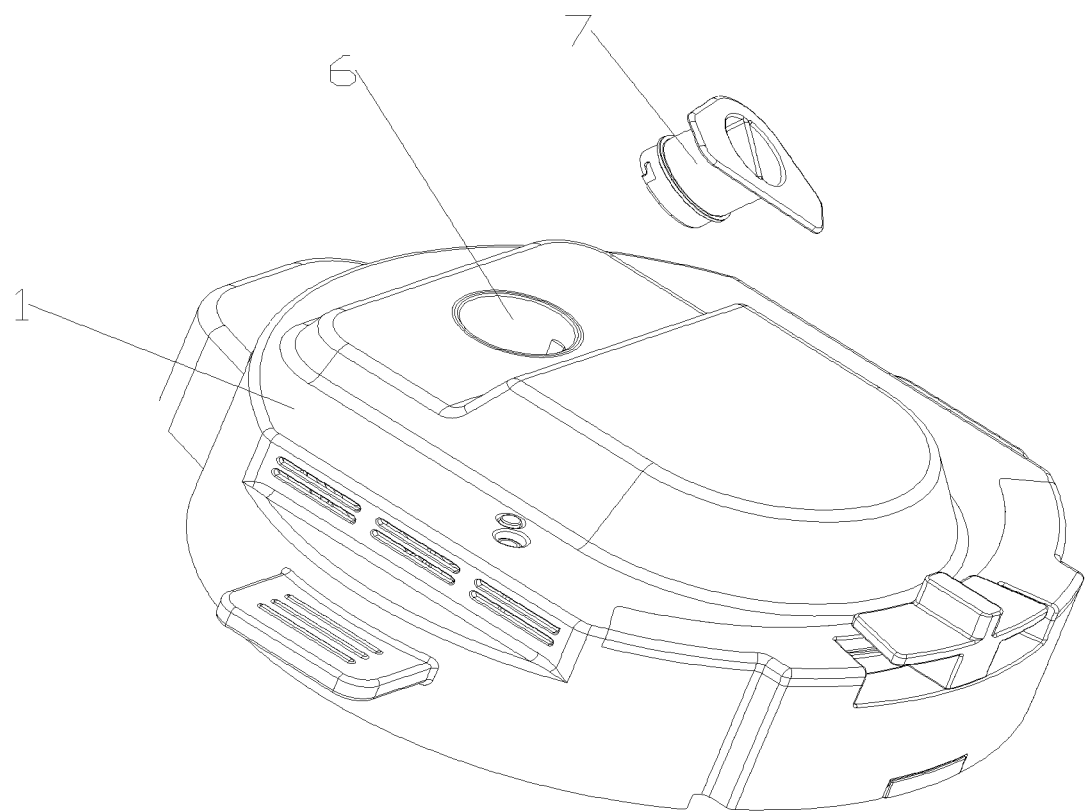
FIG. 8 shows a schematic view of the assembly relationship between the venting cap in FIG. 7 and the appliance cover.
Figure 9:
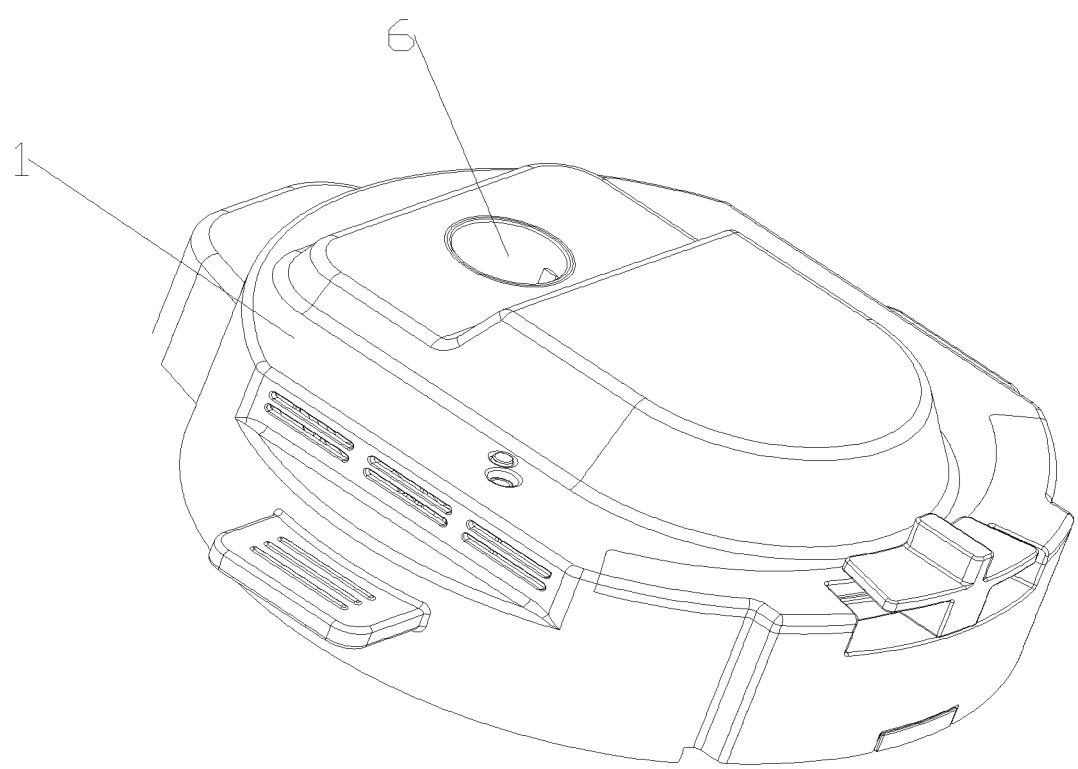
FIG. 9 shows an overall structural schematic view of the appliance cover in FIG. 8.
Figure 10:
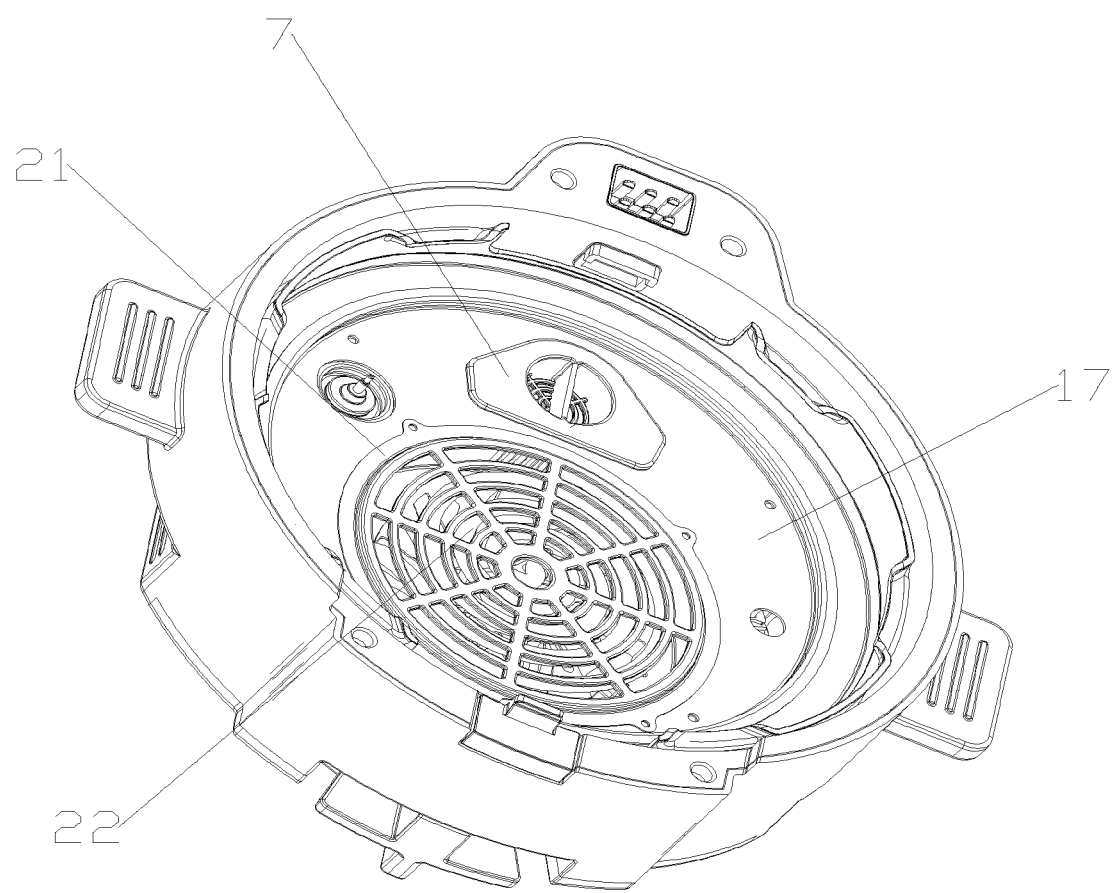
FIG. 10 shows an overall structural schematic view from an angle of the appliance cover in FIG. 1.
Figure 11:
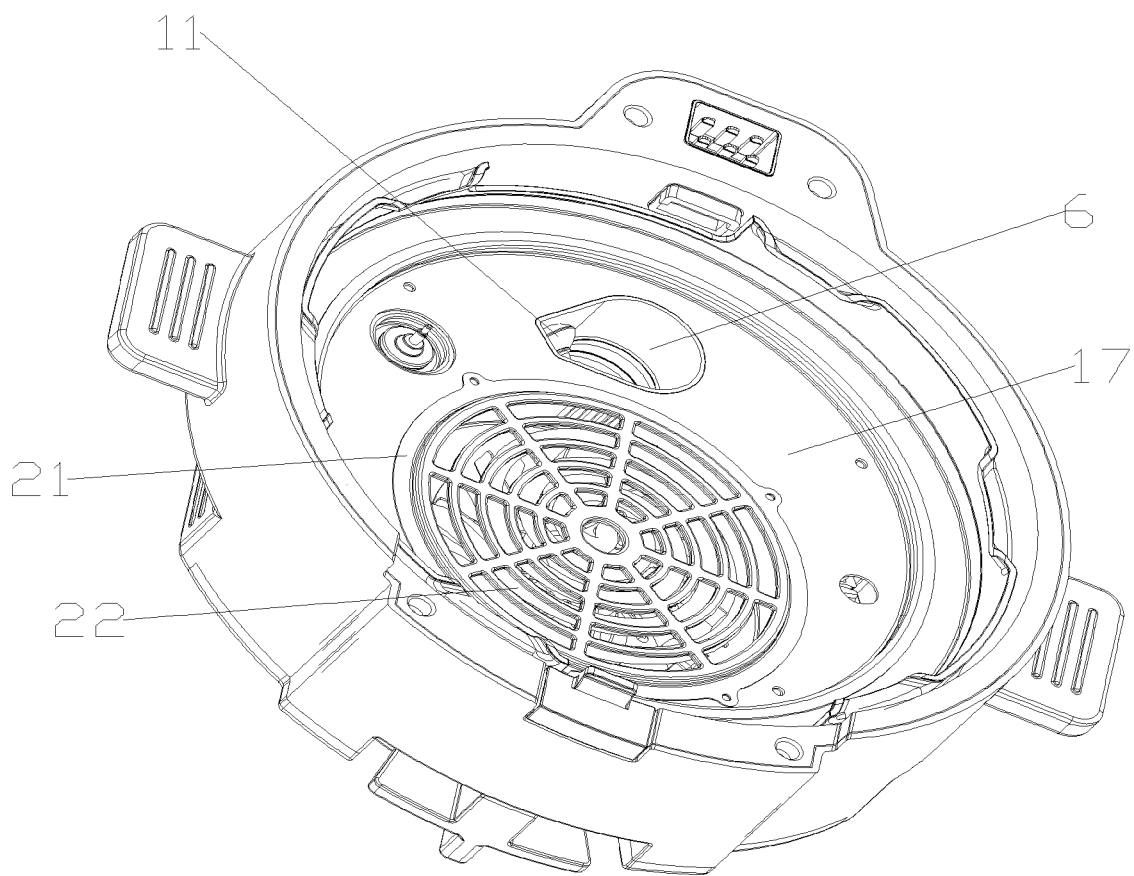
FIG. 11 shows a structural schematic view of the appliance cover in FIG. 10 without a venting cap mounted.

As shown in FIG. 6, a side wall of the venting passage 6 is provided with a second through hole 12. When the venting cap 7 is assembled at the bottom end of the venting passage 6, the venting cap 7 blocks the second through hole 12. When the venting cap 7 is assembled at the top end of the venting passage 6, the second through hole 12 is in communication with the venting passage 6. The switching of position of the venting cap 7 can cause the second through hole 12 to be opened and closed, so that the second through hole 12 functions or does not function.

It should be noted that "block" means that the second through hole 12 is isolated so that air inside the appliance body 2 does not flow into the second through hole 12. This can be realized by pressing the venting cap 7 against the second through hole 12, but not necessarily. The venting cap 7 can be arranged to be spaced apart from the second through hole 12, so long as the second through hole 12 is isolated from the air flowing path.

The venting cap 7 will be assembled at the top end of the venting passage 6 only when the inner lid 3 is assembled to the appliance cover 1, so as to spare space for the inner lid 3. In other words, the first through hole 8 and the second through hole 12 are blocked under different cooking modes, so that they perform different functions. When the inner lid 3 is not mounted to the appliance cover 1, the venting cap 7 is assembled at the bottom end of the venting passage 6, so as to block the second through hole 12, in order to prevent oily waste vapor produced by baking when the cooking appliance operates to cook by baking from flowing into the second through hole 12, reducing accumulation of such oily waste vapor inside the second through hole 12.

Figure 3:
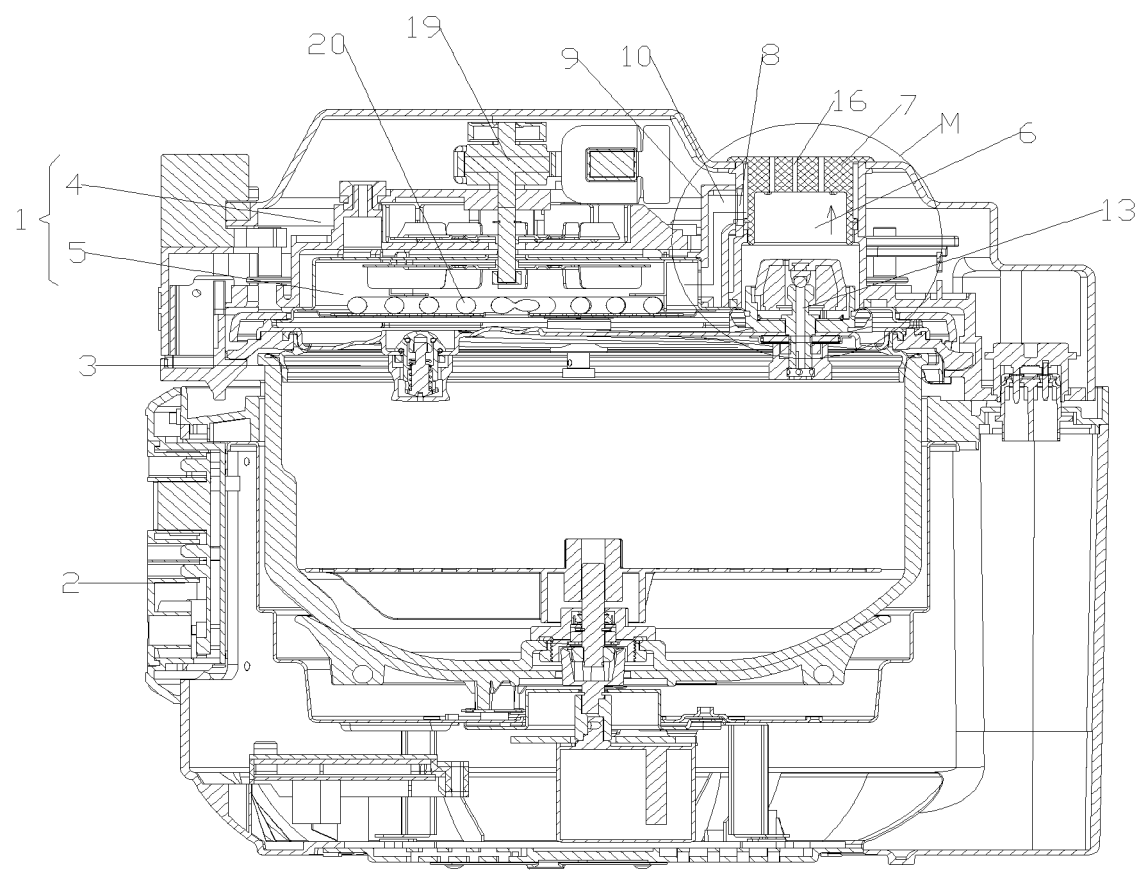
FIG. 3 shows a structural schematic view of the cooking appliance in FIG. 1 after an inner lid is mounted.
Figure 4:
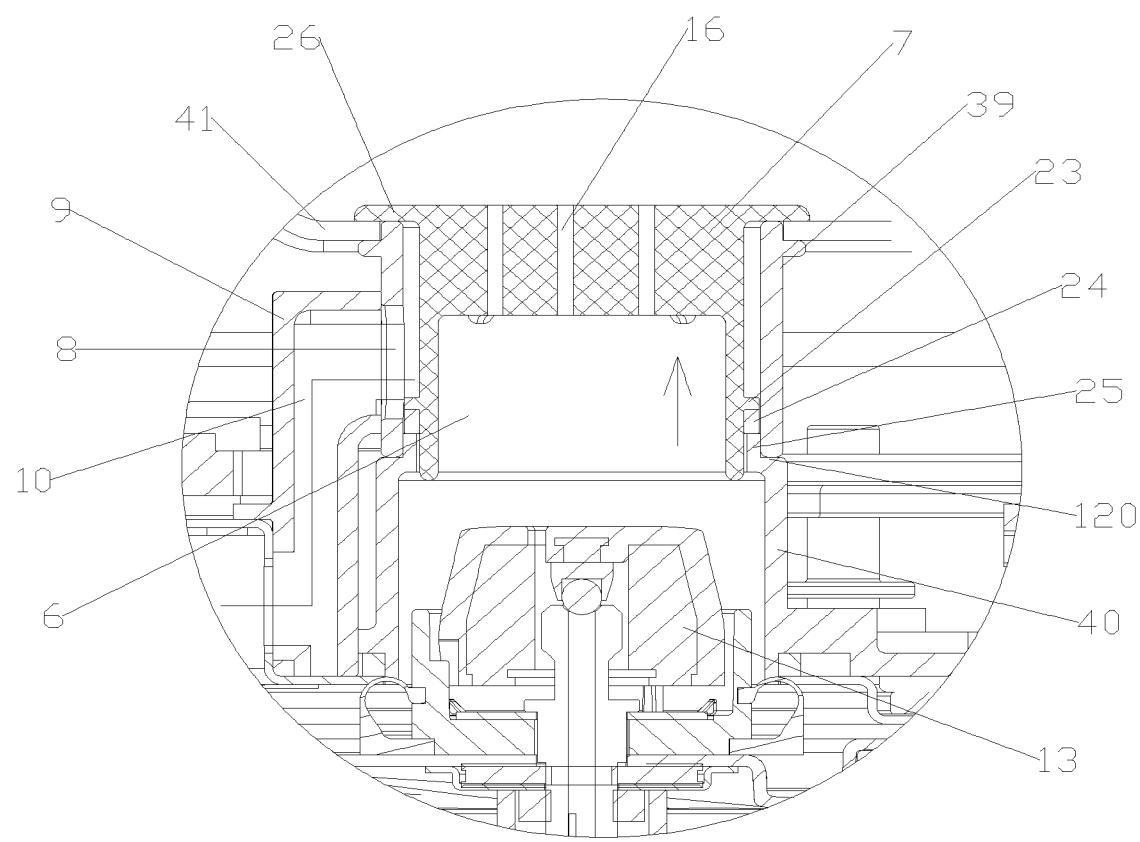
FIG. 4 shows an enlarged view of the detail M in FIG. 3.

As shown in FIG. 3, FIG. 4 and FIG. 6, the inner lid 3 is provided with a pressure limiting valve assembly 13 extending into the venting passage 6 and located at the second through hole 12. The cover body 4 comprises a push bar 11 extending out of the second through hole 12, so that the push bar 11 can operate the pressure limiting valve assembly 13. When the venting cap 7 is mounted at the top end of the venting passage 6, the second through hole 12 is in communication with the venting passage 6, so that the push bar 11 can extend out of the second through hole 12 to push the pressure limiting valve assembly 13, causing air inside the cooking appliance to be vented through the pressure limiting valve assembly 13. When the venting cap 7 is assembled at the bottom end of the venting passage 6, the venting cap 7 blocks the second through hole 12, so as to conceal the push bar 11 and prevent oily waste from accumulating on the push bar 11.

It should be noted that, the cover body 4 further comprises a push bar sealing ring that is sleeved on the push bar 11 and abuts against the second through hole 12, so as to seal the gap between the push bar 11 and the second through hole 12, preventing high temperature humid air from entering into the inside of the cover body 4 when the cooking appliance operates to conventionally cook, thus reducing the effect of high temperature humid air on electrical parts inside the cover body 4, and improving the stability and safety of the utilization of the cover body 4. In addition, during cooking by baking, the baking temperature is very high, and the push bar sealing ring is very susceptible of aging if in the environment of the baking temperature for a long time, causing air leaking between the push bar 11 and the second through hole 12 and having very high hidden safety hazard. The venting cap 7 blocks the second through hole 12, so as to isolate the push bar sealing ring, reducing the effect of the baking temperature on the push bar sealing ring, improving the reliability and stability of the functioning of the push bar sealing ring, and at the same time lengthening the service life of the push bar sealing ring.

As shown in FIG. 5 and FIG. 13 to FIG. 15, an outer wall of the venting cap 7 is provided with a first position limiting structure 14, and a side wall of the venting passage 6 is provided with a second position limiting structure 15 that cooperates with the first position limiting structure 14. When the venting cap 7 is mounted to the venting passage 6, the first position limiting structure 14 is connected in a snap-fit manner with the second position limiting structure 15. With the cooperation between the first position limiting structure 14 and the second position limiting structure 15, the venting cap 7 can be steadily mounted inside the venting passage 6, reducing the likelihood of the venting cap 7 being detached from the venting passage 6, and improving the stability of the functioning of the venting cap 7. When the venting cap 7 is assembled at the bottom end of the venting passage 6, thanks to the position limiting cooperation between the first position limiting structure 14 and the second position limiting structure 15, the venting cap 7 is thus prevented from falling off.

Figure 5:
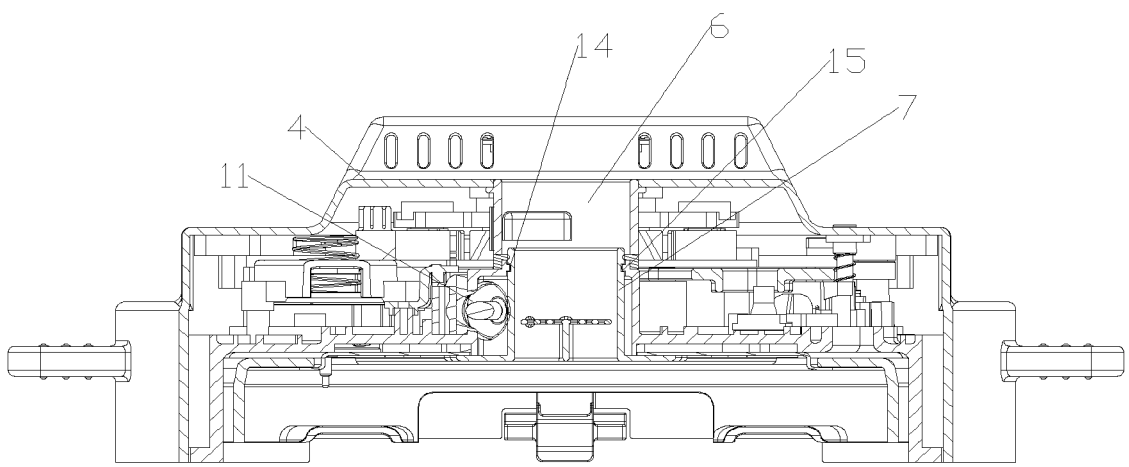
FIG. 5 shows a sectional view from an angle of the appliance cover in FIG. 1.

As shown in FIG. 5, preferably there are a plurality of first position limiting structures 14 arranged in an equally-spaced-apart manner. The first position limiting structures 14 are configured to correspond, one by one, to the second position limiting structures 15. This configuration can ensure that the venting cap 7 is steadily mounted inside the venting passage 6.

Figure 14:
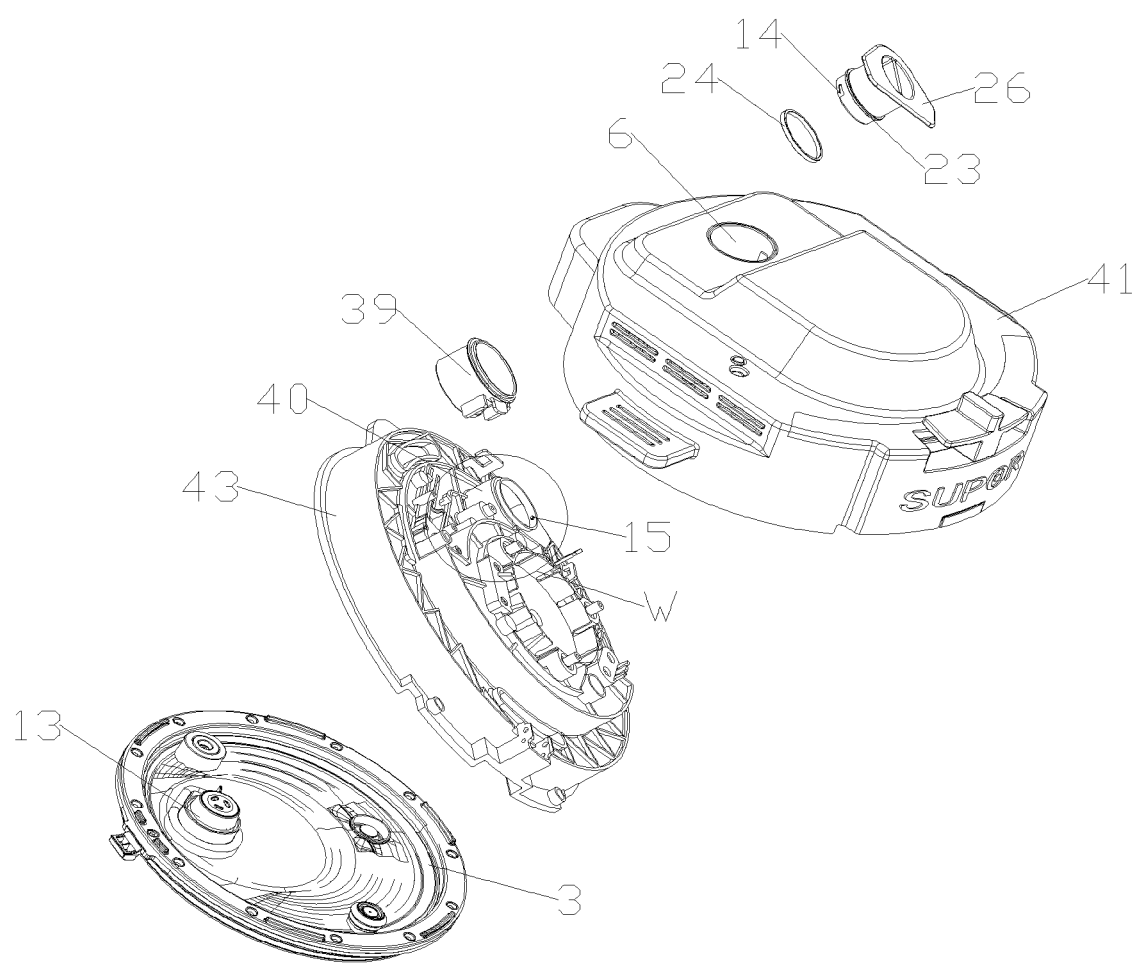
FIG. 14 shows an exploded view of the appliance cover in FIG. 3.
Figure 15:
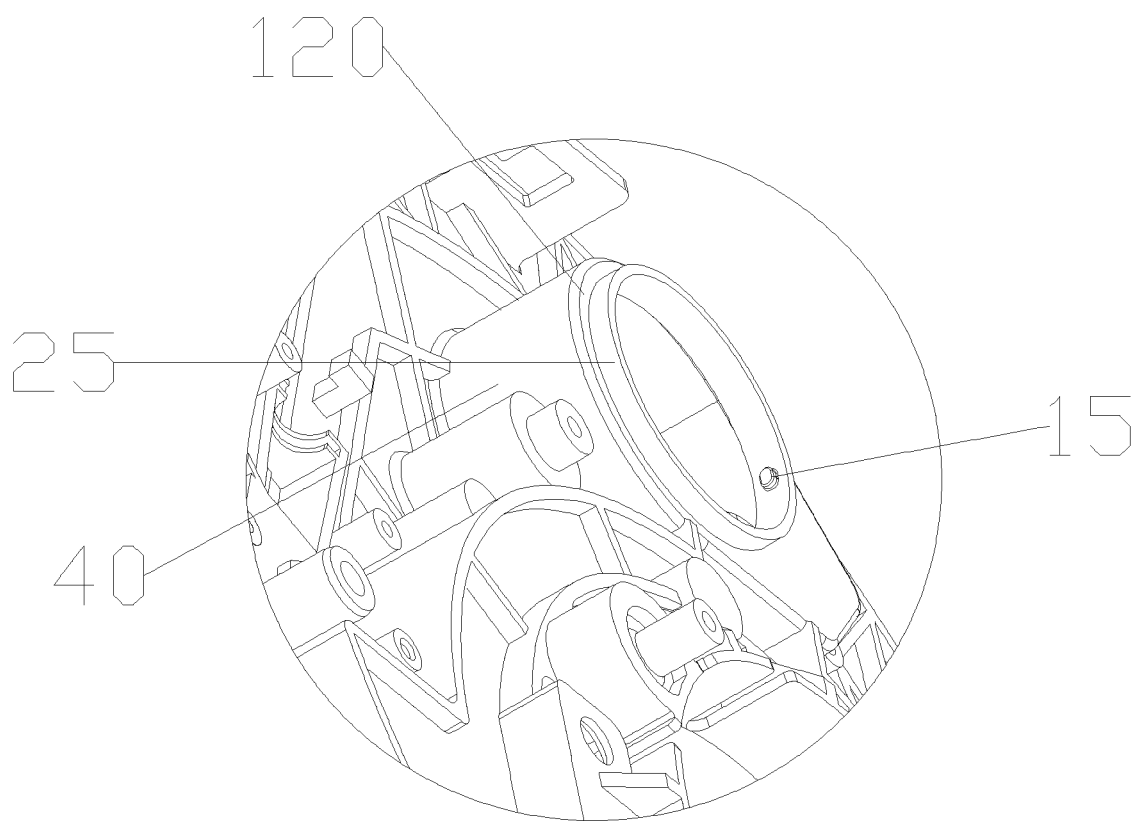
FIG. 15 shows an enlarged view of the detail W in FIG. 14.

As shown in FIG. 14 and FIG. 15, the first position limiting structure 14 is a position limiting protrusion, and the second position limiting structure 15 is a position limiting slot; or, the first position limiting structure 14 is a position limiting slot, and the second position limiting structure 15 is a position limiting protrusion. This configuration facilitates the assembly between the first position limiting structure 14 and the second position limiting structure 15, and the first position limiting structure 14 and the second position limiting structure 15 are not easily detached from each other, so as to ensure the stability of the functioning of the venting cap 7.

Optionally, the position limiting slot is an L-shaped slot, and the position limiting protrusion is a position limiting protruding point capable of extending into the L-shaped slot. This approach of snap-fit connecting by rotation renders it difficult for the position limiting protruding point from sliding out of the L-shaped slot, improving the stability of the cooperation between the first position limiting structure 14 and the second position limiting structure 15, and preventing the venting cap 7 from slipping off from the venting passage 6.

Figure 13:
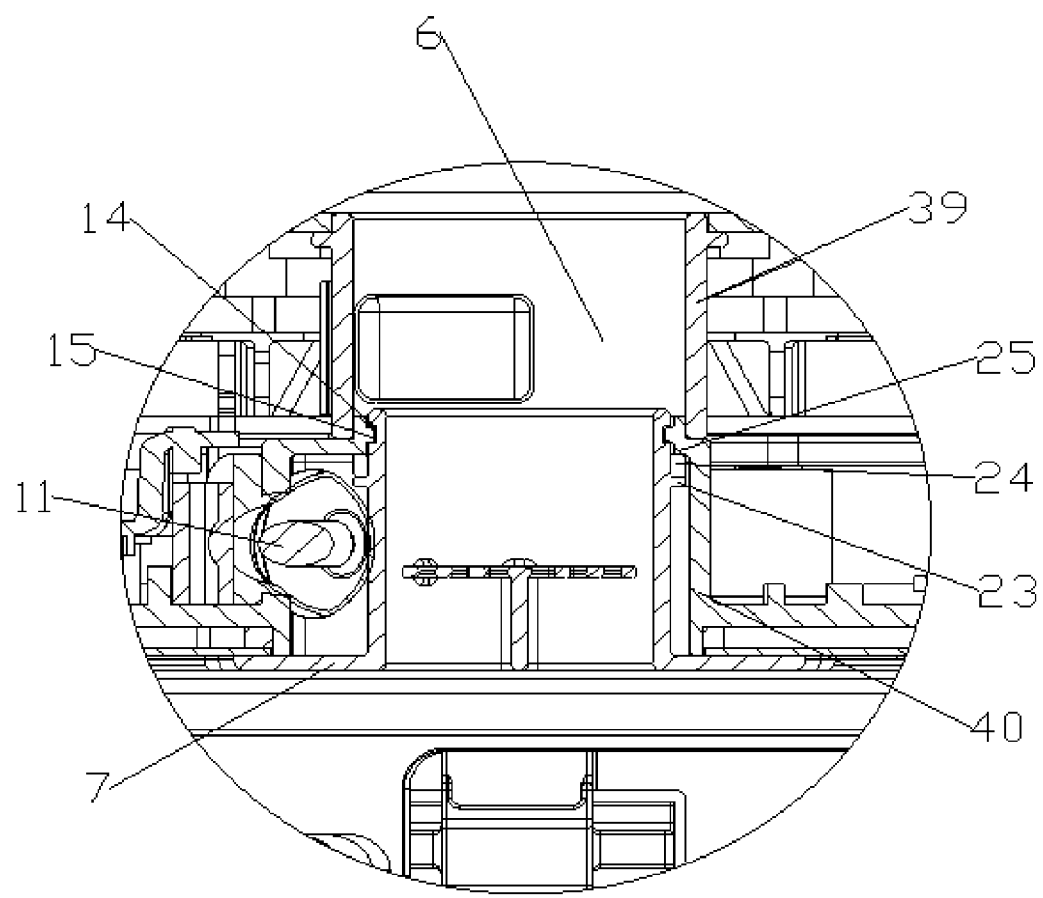
FIG. 13 shows an enlarged view of the detail N in FIG. 12.

As shown in FIG. 13, the appliance cover 1 further comprises a sealing structure 24 sleeved on an outer wall of the venting cap 7 and located above the first position limiting structure 14. The sealing structure 24 is connected in a snap-fit manner between the 0 venting cap 7 and the venting passage 6, and seals the gap between the first position limiting structure 14 and the second position limiting structure 15, reducing air flowing into the first through hole 8 or the second through hole 12. After the first position limiting structure 14 and the second position limiting structure 15 are assembled together, there exists a certain gap between the first position limiting structure 14 and the second position limiting structure 15, so as to facilitate the assembly between the first position limiting structure 14 and the second position limiting structure 15.

It should be noted that, the sealing structure 24 being located above the first position limiting structure 14 means that when the venting cap 7 is placed upright (in a state where the venting cap 7 is assembled at the top of the venting passage 6), the sealing structure 24 is located above the first position limiting structure 14 (in FIG. 13, the sealing structure 24 is located below the first position limiting structure 14).

Figure 2:
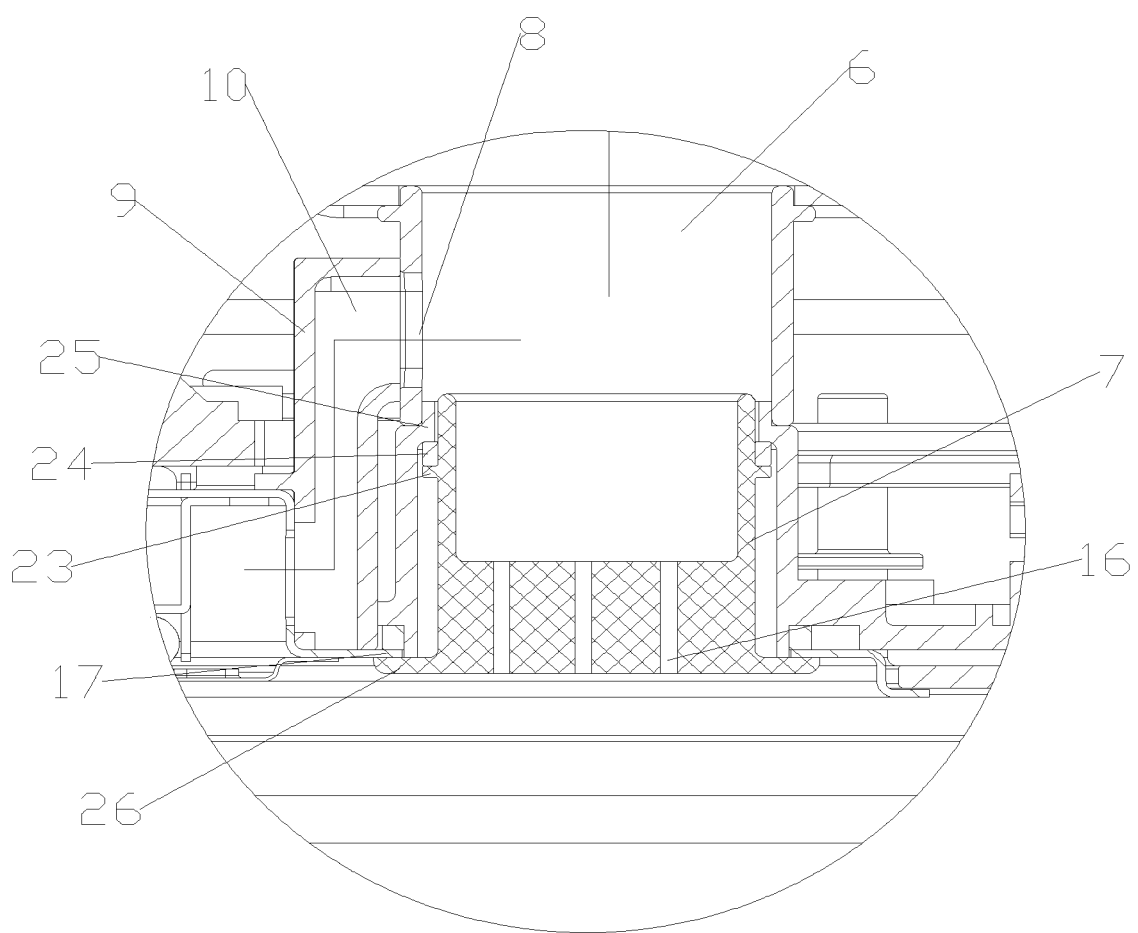
FIG. 2 shows an enlarged view of the detail P in FIG. 1.

As shown in FIG. 2 and FIG. 4, the venting cap 7 is provided with an abutting flange 26 located at one end of the venting cap 7. When the venting cap 7 is assembled at the top end of the venting passage 6, the abutting flange 26 overlaps with a face cover 41 of the cover body 4 and achieves sealing with the face cover 41. When the venting cap 7 is assembled at the bottom end of the venting passage 6, the abutting flange 26 abuts against the reflective cover 17 of the cover body 4 and achieves sealing with the reflective cover 17. By providing the abutting flange 26, sealing of a part of the structure of the venting passage 6 is achieved, so as to reduce the effect of air on the venting passage 6.

As shown in FIG. 4, when the venting cap 7 is assembled at the top of the venting passage 6, the abutting flange 26 abuts against the face cover 41 in a sealing manner, preventing air from entering into the first through hole 8 via the gap between the face cover 41 and the venting passage 6. At this time, the sealing structure 24 is located below the first through hole 8 and seals the gap between the first position limiting structure 14 and the second position limiting structure 15, preventing air inside the appliance body 2 from entering into the first through hole 8. The first through hole 8 is located at a position between the sealing structure 24 and the abutting flange 26, so that the venting cap 7 blocks the first through hole 8.

As shown in FIG. 2, when the venting cap 7 is assembled at the bottom of the venting passage 6, the abutting flange 26 abuts against the reflective cover 17 in a sealing manner, preventing air inside the appliance body from entering into the second through hole 12 via the gap between the reflective cover 17 and the venting passage 6. At this time, the sealing structure 24 is located above the second through hole 12 and seals the gap between the first position limiting structure 14 and the second position limiting structure 15, preventing air outside the cooking appliance or vented out of the appliance body 2 from entering into the second through hole 12. The second through hole 12 is located at a position between the sealing structure 24 and the abutting flange 26, so that the venting cap 7 blocks the second through hole 12.

As shown in FIG. 2 and FIG. 4, the appliance cover 1 further comprises a sealing structure 24 sleeved to an outer wall of the venting cap 7. The outer wall of the venting cap 7 is provided with a first snap-fit connecting flange 23, and an inner wall of the venting passage 6 is provided with a second snap-fit connecting flange 25 that cooperates with the sealing structure 24. The sealing structure 24 is connected in a snap-fit manner between the first snap-fit connecting flange 23 and the second snap-fit connecting flange 25, so as to prevent the sealing structure 24 from dropping out, ensuring that the sealing structure 24 can steadily seal the gap between the venting cap 7 and the venting passage 6.

As shown in FIG. 1 and FIG. 3, the baking assembly 5 is mounted in an eccentric manner below the cover body 4, and is arranged to avoid the venting passage 6, so that hot air produced by the baking assembly 5 is vented out via the venting passage 6 only after having circulated inside the appliance body 2, in order to increase the utilization of hot air produced at the baking assembly 5 and the baking efficiency of the baking assembly 5.

Optionally, a bottom face of the baking assembly 5 is flush with the bottom end of the venting passage 6. This configuration facilitates mounting the inner lid 3 to the appliance cover 1, so as to ensure the stability of the functioning of the appliance cover 1.

It should be noted that, there can be many ways in which the venting cap 7 blocks the first through hole 8 or the second through hole 12, which are described by taking the venting cap 7 blocking the first through hole 8 as an example.

In a first situation, the venting cap 7 blocks the first through hole 8 by means of the sealing structure 24, so as to seal the first through hole 8.

In a second situation, an outer wall of the venting cap 7 is in direct contact with the first through hole 8 to seal the first through hole 8.

In a third situation, at the top of the venting cap 7, the abutting flange 26 abuts against the face cover 41 in a sealing manner. At the bottom of the venting cap 7, the sealing structure 24 is connected in a snap-fit manner between the first snap-fit connecting flange 23 and the second snap-fit connecting flange 25, so as to limit the first through hole 8 to the gap between the abutting flange 26 and the sealing structure 24, and the first through hole 8 is arranged in a manner spaced apart from the outer wall of the venting cap 7. In this situation, air cannot enter into the first through hole 8 either.

In a fourth situation, at the bottom of the venting cap 7, the sealing structure 24 is connected in a snap-fit manner between the first snap-fit connecting flange 23 and the second snap-fit connecting flange 25, so as to isolate the first through hole 8 from the air flow path. Furthermore, the first through hole 8 is arranged in a manner spaced apart from the outer wall of the venting cap 7. This situation also involves blocking the first through hole 8. The first through hole 8 is in communication with the outside space. All that is needed is to ensure that air inside the appliance body 2 does not flow into the first through hole 8.

It should be noted that, because the second through hole 12 is located below the first through hole 8, the fourth situation does not exist for the second through hole 12.

Figure 12:
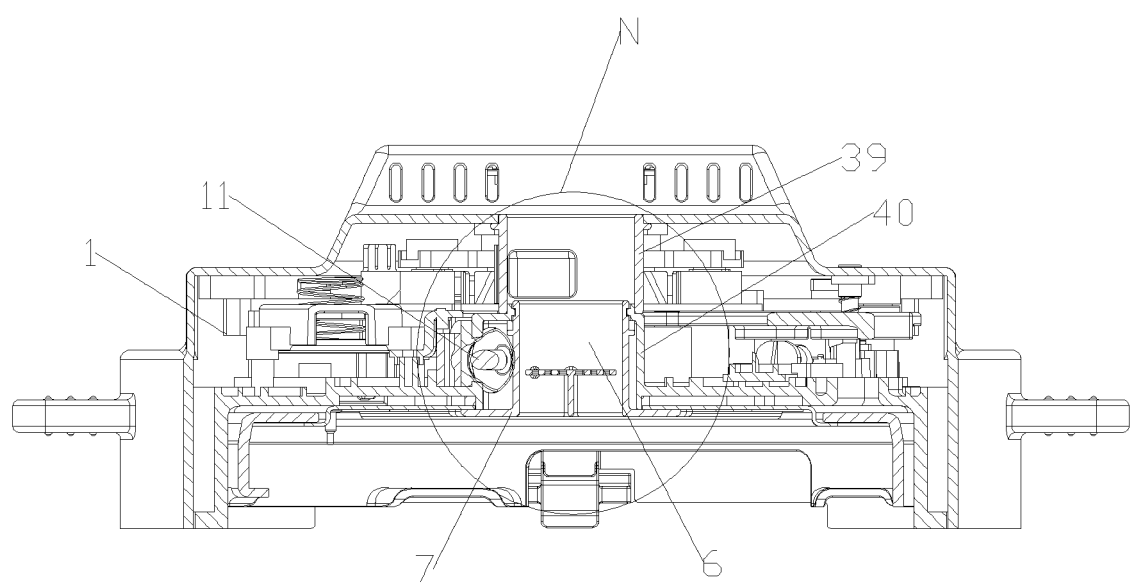
FIG. 12 shows a sectional view from another angle of the appliance cover in FIG. 1.

As shown in FIG. 12, the cover body 4 comprises a connecting cylinder 39 and an abutting cylinder 40 that are arranged coaxially and form the venting passage 6. The connecting cylinder 39 is located above the abutting cylinder 40, and is provided with a first through hole 8, and the abutting cylinder 40 is provided with a second through hole 12. A cylinder wall of the abutting cylinder 40 is provide with an abutting segment 120 extending towards the center of the abutting cylinder 40, and is also provided with a second snap-fit connecting flange 25 extending upwards from the abutting segment 120. Furthermore, the connecting cylinder 39 abuts against the abutting segment 120 and is located outside the second snap-fit connecting flange 25. The abutting cylinder 40 extends upwards from a lining 43.

As shown in FIG. 4, when the venting cap 7 is assembled at the top end of the venting passage 6, a top face of the second snap-fit connecting flange 25 abuts against the sealing structure 24. In the specific embodiment shown in FIG. 2, when the venting cap 7 is assembled at the bottom end of the venting passage 6, a bottom face of the second snap-fit connecting flange 25 abuts against the sealing structure 24.

Obviously, the embodiments described above are merely some but not all of the embodiments of the invention. Based on the embodiments in the invention, all other embodiments obtained by an ordinary person skilled in the art without creative labor shall all fall within the protection scope of the invention.

It should be noted that, the terms used herein are merely for describing specific modes of realization, and not intended to limit exemplary modes of realization according to the application. As used herein, unless otherwise specifically indicated elsewhere herein, the singular form is intended to also include the plural form. In addition, it should be noted that, when the term "comprise" and/or "include" is used in this specification, it indicates there exists a feature, step, functioning, part, assembly and/or their combination.

It should be noted that, the terms "first", "second" and so on in the description, the claims and the drawings of the application are used to distinguish similar objects, and not necessarily to describe a particular order or sequence. It should be understood that the numbers used in this way can be exchangeable if appropriate, so that the modes of realization of the application described herein can be realized in an order other than those illustrated or described herein.

What has been described above are merely preferred embodiments of the invention, and is not intended to limit the invention. To a person skilled in the art, the invention can be subject to various modifications and changes. Any modification, equivalent replacement and improvement made within the spirit and principle of the invention shall all fall within the protection scope of the invention.

The invention claimed is:

1. A cooking appliance, comprising an appliance cover, an appliance body, and an inner lid, the appliance cover coveringly arranged above the appliance body in a closable and openable manner, the appliance body provided with a heating structure, wherein, the appliance cover comprises:
   a cover body provided with a venting passage through which the inside of the cooking appliance is in communication with the outside, the inner lid detachably mounted to the cover body;
   a baking assembly arranged below the cover body, the inner lid located below the baking assembly when mounted to the cover body; and
   a venting cap, the venting cap being detachably mounted at any one end of two ends of the venting passage, wherein the venting cap is assembled at a bottom end of the venting passage when the inner lid is unmounted, and the venting cap is assembled at a top end of the venting passage after the inner lid is mounted.

2. The cooking appliance according to claim 1, wherein, the venting cap is provided with venting holes, and is connected with the venting passage in a sealing manner.

3. The cooking appliance according to claim 1, wherein, a side wall of the venting passage is provided with a first through hole in communication with a space inside the baking assembly,
   wherein the first through hole being in communication with the venting passage when the venting cap is assembled at the bottom end of the venting passage; and
   wherein the venting cap is configured to prevent air inside the appliance body from entering into the first through hole when the venting cap is assembled at the top end of the venting passage.

4. The cooking appliance according to claim 3, further comprising an air admission leading structure including an air admission passage, wherein the first through hole is in communication with interior of the baking assembly through the air admission leading structure.

5. The cooking appliance according to claim 3, wherein, the appliance cover further comprises a sealing structure sleeved on an outer wall of the venting cap, and the venting cap blocks the first through hole by using the sealing structure when the venting cap is assembled at the top end of the venting passage.

6. The cooking appliance according to claim 5, wherein, the outer wall of the venting cap is provided with a first snap-fit connecting flange, an inner wall of the venting passage is provided with a second snap-fit connecting flange, and the sealing structure is connected in a snap-fit manner between the first snap-fit connecting flange and the second snap-fit connecting flange.

7. The cooking appliance according to claim 1, wherein, a side wall of the venting passage is provided with a second through hole in communication with a pressure limiting valve assembly,
   wherein the venting cap blocking air inside the appliance body from entering into the second through hole when the venting cap is assembled at the bottom end of the venting passage; and
   wherein the second through hole is in communication with the venting passage when the venting cap is assembled at the top end of the venting passage.

8. The cooking appliance according to claim 7, wherein, the inner lid is provided with the pressure limiting valve assembly extending into the venting passage and located at the second through hole, the cover body comprising a push bar extending out of the second through hole, so that the push bar can operate the pressure limiting valve assembly.

9. The cooking appliance according to claim 7, wherein the appliance cover further comprises a sealing structure sleeved on an outer wall of the venting cap, and the venting cap blocks the second through hole by using the sealing structure when the venting cap is assembled at the bottom end of the venting passage.

10. The cooking appliance according to claim 1, wherein, an outer wall of the venting cap is provided with a first position limiting structure, and a side wall of the venting passage is provided with a second position limiting structure that cooperates with the first position limiting structure, the first position limiting structure connected in a snap-fit manner with the second position limiting structure when the venting cap is mounted to the venting passage.

11. The cooking appliance according to claim 10, wherein, the first position limiting structure is one of a position limiting protrusion and a position limiting slot, and the second position limiting structure is the other of the position limiting protrusion and the position limiting slot.

12. The cooking appliance according to claim 1, wherein, the venting cap is provided with an abutting flange located at one end of the venting cap,

- wherein the abutting flange overlaps a face cover of the cover body and seals the face cover when the venting cap is assembled at the top end of the venting passage; and
- wherein the abutting flange abuts a reflective cover of the cover body and seals the reflective cover when the venting cap is assembled at the bottom end of the venting passage.

\* \* \* \* \*